April 14, 1970     A. R. CRAWFORD     3,505,864
ENGINE TIMER

Filed Dec. 19, 1967                          6 Sheets-Sheet 1

INVENTOR.
ARTHUR R. CRAWFORD
BY
Schmieding & Sultz
ATTORNEYS

INVENTOR.
ARTHUR R. CRAWFORD
BY
Schmieding & Fuchs
ATTORNEYS

April 14, 1970     A. R. CRAWFORD     3,505,864
ENGINE TIMER

Filed Dec. 19, 1967     6 Sheets-Sheet 4

INVENTOR.
ARTHUR R. CRAWFORD
BY
*Schmieding & Fultz*
ATTORNEYS

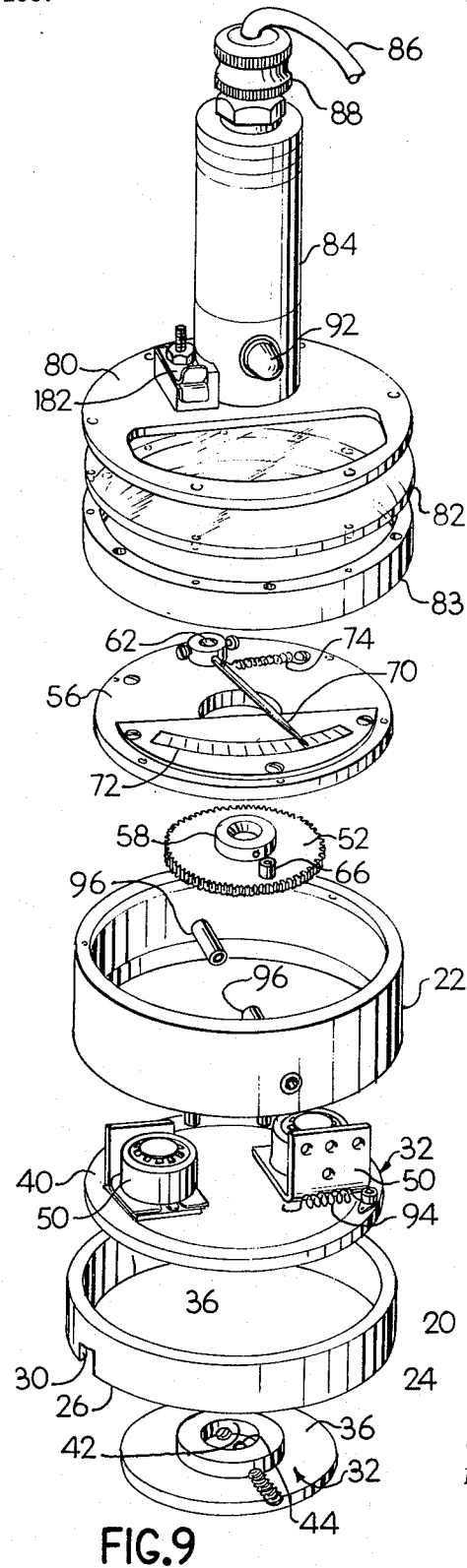

3,505,864
ENGINE TIMER
Arthur R. Crawford, Columbus, Ohio, assignor to Electronics Marketing Corporation, Columbus, Ohio, a corporation of Ohio
Filed Dec. 19, 1967, Ser. No. 691,894
Int. Cl. G01m 15/00
U.S. Cl. 73—118     13 Claims

ABSTRACT OF THE DISCLOSURE

An engine timer for internal combustion engines adapted to be mounted on a distributor housing and used as an instrument to set the ignition timing with the engine in a static state. The instrument measures the relative angular rotation between the engine's distributor housing and distributor rotor with respect to a position wherein the ignition points have opened and is characterized by an angle of rotation indicator and means for energizing said indicator, at the instant the ignition points open, responsive to rotation of the distributor housing by the operator.

---

This invention relates to engine timers for internal combustion engines and more particularly to a novel method and apparatus for setting the ignition timing of an engine in the static state.

In general, the engine timer of the present invention is an instrument that measures the relative angular rotation between the engine's distributor housing and distributor rotor with respect to a position wherein the ignition points have opened. When the crankshaft is set at a top dead center reference position said relative angular rotation measured by the instrument is the number of degrees in advance or retard of top dead center at which the ignition will occur.

The ignition timer of the present invention comprises a timer housing that is adapted to be mounted on the distributor housing with its cap removed and the housing keyed together.

A rotor shaft adapter means is rotatably mounted within the timer housing and adapted for keyed attachment to the distributor's rotor shaft.

The instrument further includes an angle of rotation indicator mounted on the housing and an electrically actuated clutch means that is connected in circuit with the ignition points of the distributor such that the angle of roation indicator is operatively connected to the rotor shaft adapter means, responsive to manual rotation of the housings by the operator, at the instant the ignition points open.

Further rotation of the distributor housing is precisely measured in degrees by the indicator whereby the distributor housing can be accurately positioned and locked at the precise predetermined desired firing angle.

As another aspect of the present invention the engine timer is provided with a warning light that signals the operator if the instrument is mounted on a distributor at a position wherein the ignition points have not been closed. This prevents misuse of the timer in obtaining a false reading.

As another aspect of the present invention the engine timer is provided with spring means operative between the above mentioned timer housing and rotor shaft adapter means which spring means functions, at the outset of the timing operation, to first accurately move the rotor shaft into its precise operating position wherein all backlash has been removed from the rotor shaft driving gears.

It is, therefore, an object of the present invention to provide a novel method and apparatus for accurately setting the ignition timing of engines while the engines are in a static state.

It is another object of the present invention to provide a novel apparatus for setting the ignition timing of engines that includes an indicator that visually displays the number of degrees the distributor housing has been moved with respect to a top dead center reference position, thereby eliminating the possibility of setting the distributor at a position beyond the predetermined desired firing angle.

It is another object of the present invention to provide a novel apparatus for setting the ignition timing of engines that includes a signal that warns the operator if the instrument is improperly mounted on the distributor with the ignition points already opened. This prevents the operator from taking a false reading and improperly setting the timing in accordance therewith.

It is another object of the present invention to provide a novel apparatus for setting the ignition timing of engines that automatically, at the outset of a timing operation, accurately positions the rotor shaft of the distributor in its precise operating position with all backlash removed from its driving gears.

It is another object of the present invention to provide a novel apparatus for setting the ignition timing of engines that accurately indicates to the operator any error that may be imposed on the firing angle, after it has been set, when the operator tightens down the distributor housing locking bolt. If such error should occur, the operator then knows that he must reset the firing angle.

Further objects and advantages of the present invention will be apparent from the following description, reference being had to the accompanying drawings wherein a preferred form of embodiment of the invention is clearly shown.

In the drawings:

FIG. 9 is an exploded perspective view showing the components of the engine timer of the preceding figures.

Figure 8:
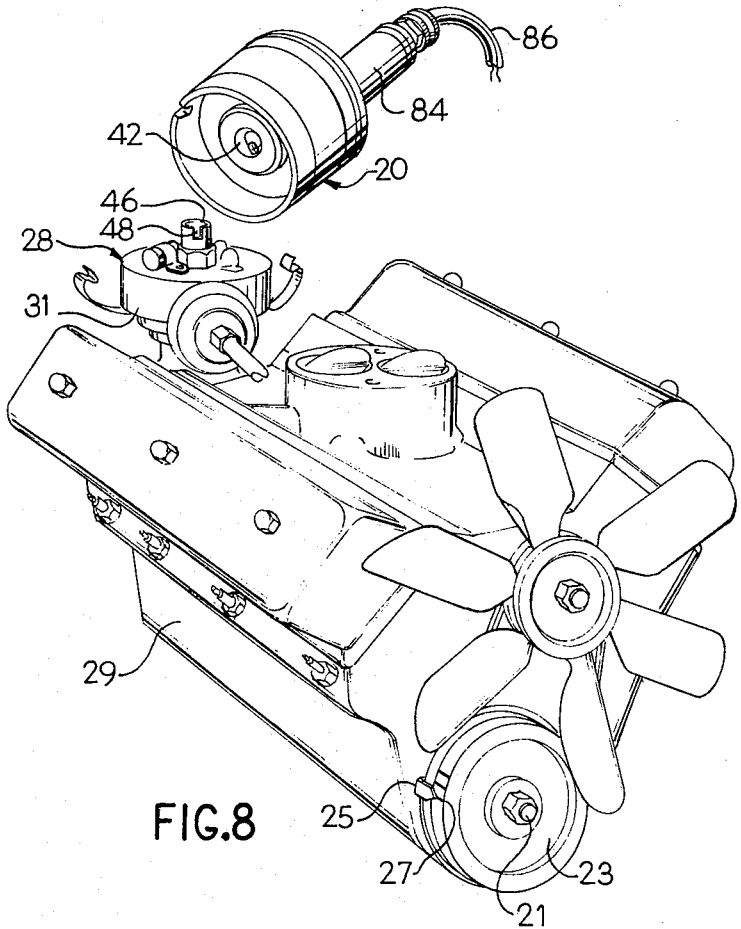
FIG. 8 is a perspective view of an engine being timed by the present invention, which view illustrates how the engine timer is moved into position on the engine's distributor with the distributor cap removed.

Referring in detail to the drawings, the engine timer of the present invention includes a timer housing indicated generally at 20 that includes an annular side wall portion 22 and a housing adapter portion 24 provided with an annular lower end 26, the latter being adapted to be mounted on the top of a distributor housing 31 of a distributor indicated generally at 28 in FIG. 8.

Figure 1:
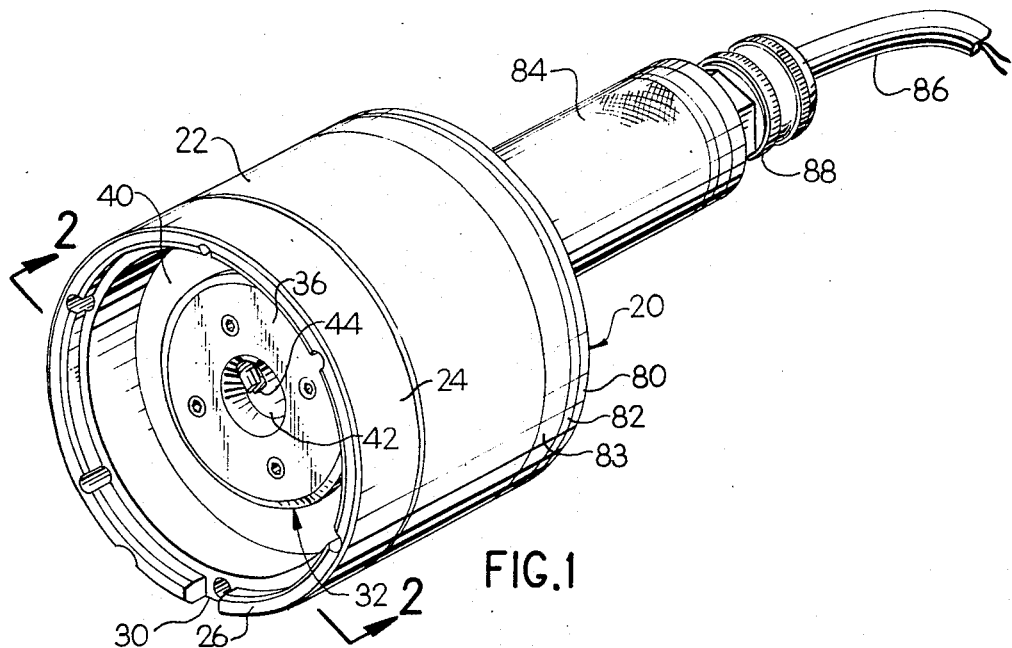
FIG. 1 is a perspective view of an engine timer constructed in accordance with the present invention.

As seen in FIG. 1, housing adapter 26 is provided with a plurality of key slots 30 which are designed to fit the top of the distributor housing whereby timer housing 20 will rotate when the distributor housing 31 is rotated during a timing operation.

As is best seen in FIGS. 2, 3, 6, and 9, the apparatus further includes a rotor shaft adapter means indicated generally at 32 that includes an upper rotor plate 34 and a lower rotor plate 36 secured together by a plurality of screws 38.

Figure 3:
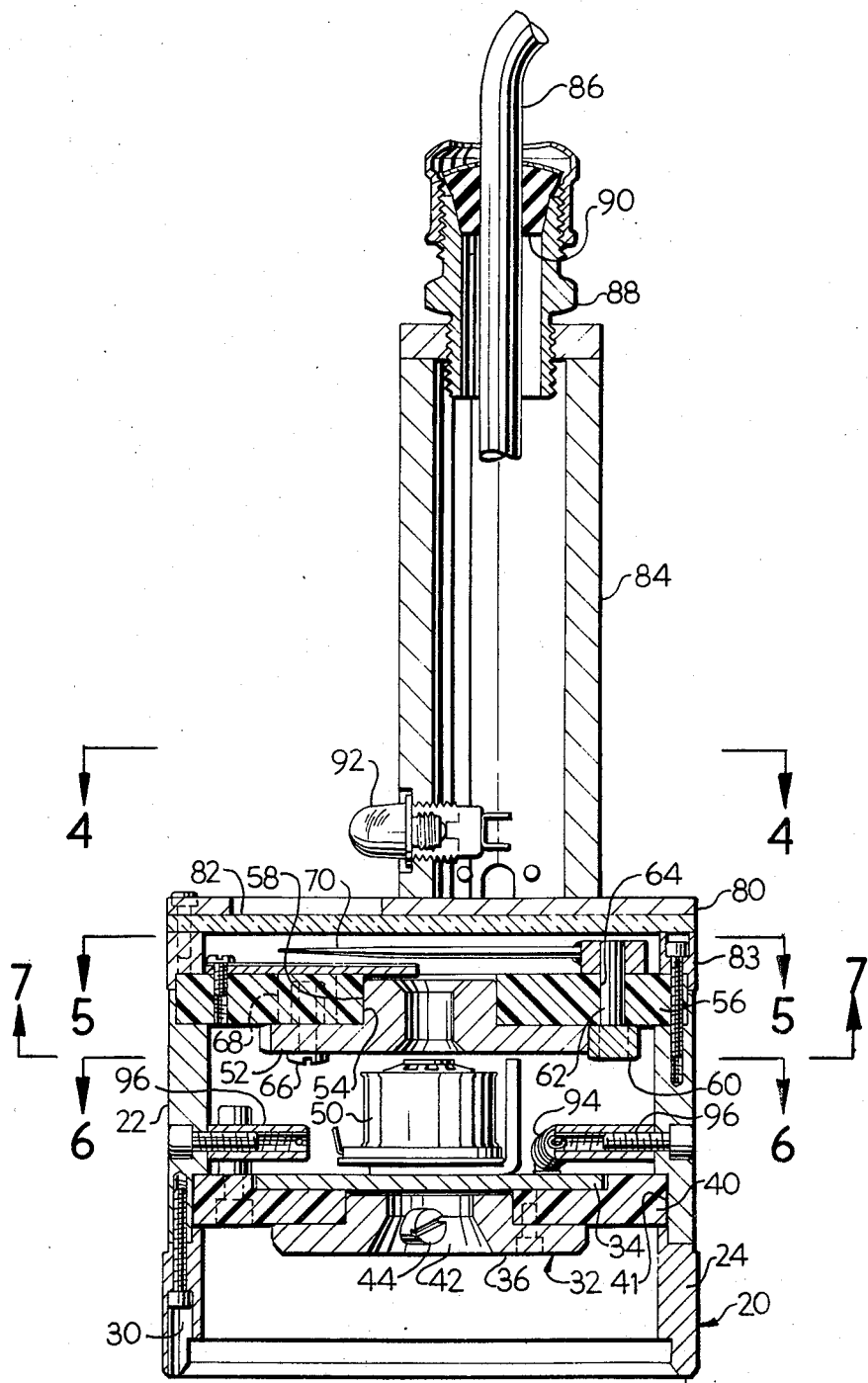
FIG. 3 is a side sectional view of the engine timer of the preceding figures, the section being taken along the line 3—3 of FIG. 2.

As is best seen in FIG. 3, a rotor bearing plate 40, preferably formed of Teflon or the like, is rotatably mounted in an annular groove between housing side wall 22 and housing adapter 24 whereby the rotor shaft adapter means 32, including plates 34, 36 and 40, are free for relative rotation as a unit with respect to timer housing 20.

Figure 2:
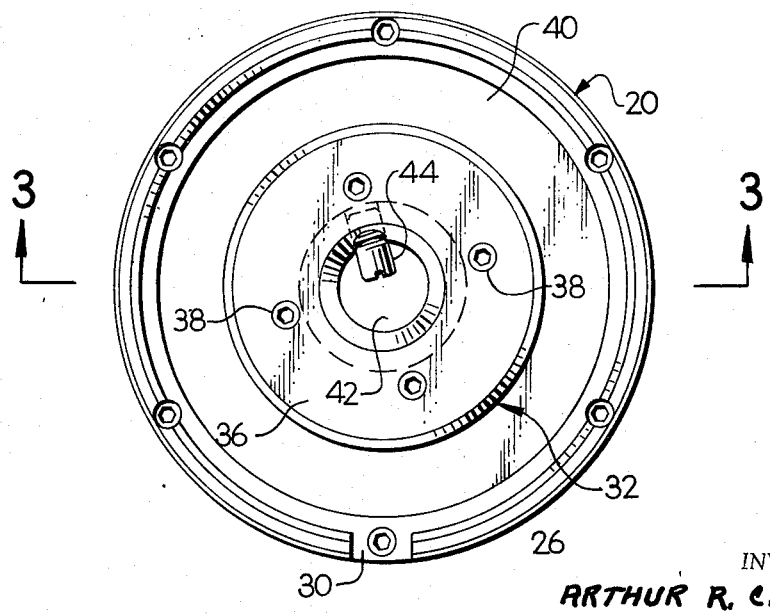
FIG. 2 is a bottom elevational view of the engine timer of FIG. 1.

With continued reference to FIGS. 2 and 3, rotor shaft adapter means 32 includes a hole 42, the side wall of which is provided with a radially inwardly extending key pin 44. When the device is placed on the top of a distributor housing the distributor rotor shaft, such as is seen at 46 in FIG. 8, is inserted into hole 42 with the key 44 positioned in a slot 48 in the top of the rotor shaft. It will now be understood that in this position the entire rotor shaft adapter means 32 is keyed to remain in a precise stationary position on the rotor shaft 46 of the distributor.

Figure 6:
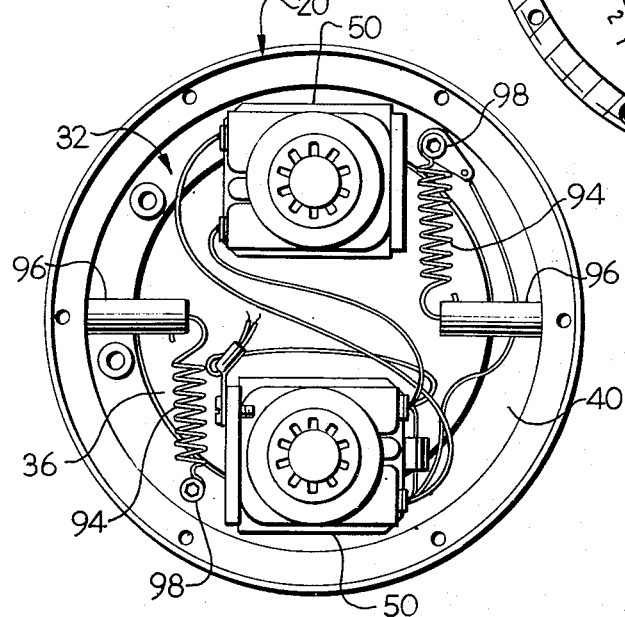
FIG. 6 is another top sectional view of the engine timer of the preceding figures showing the top of the rotor shaft adapter means, the section being taken along the line 6—6 of FIG. 4.

As is best seen in FIGS. 3 and 6, rotor shaft adapter means 32 further includes a pair of electro-magnetic clutch elements in the form of coils 50 which are adapted to magnetically engage a second clutch element in the form of a metallic gear 52 which includes a hub 58 which is rotatably mounted in a bore 54 in the center of a needle plate 56, the latter being mounted in fixed relationship on housing side wall 22. It will be noted that metal gear 52 meshes with a pinion gear 60 mounted on the lower end of a needle shaft 62, the latter being mounted for rotation in a bore 64 in the needle plate.

Figure 7:
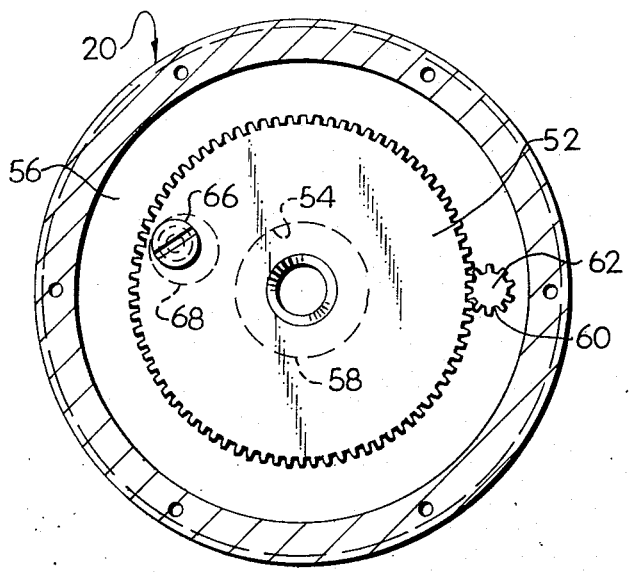
FIG. 7 is a bottom sectional view of the engine timer of the preceding figures showing the bottom of the rotor shaft adapter means, the section being taken along the line 7—7 of FIG. 3.

As seen in FIGS. 3 and 7, metal gear 52 carries an upstanding pin 66 which extends into a hole 68 in needle plate 56, with the side walls of said hole serving as a stop for limiting rotation of metal gear 52 and needle 70 which is driven thereby.

Figure 5:
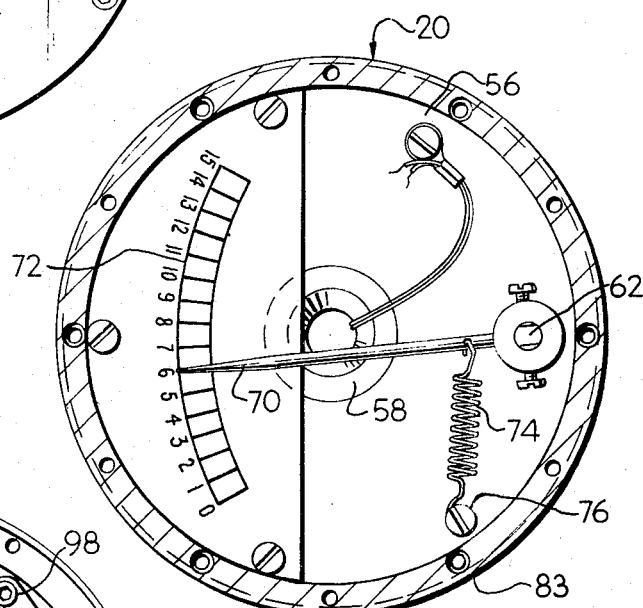
FIG. 5 is a top sectional view of the engine timer of the preceding figures showing the top of the needle plate, the section being taken along the line 5—5 of FIG. 4.

As is best seen in FIGS. 3 and 5, indicator needle 70 is mounted on top of needle shaft 62 and positioned to sweep across a dial 72 which is calibrated in degrees of angle of rotation of timer housing 20, with respect to the stationary rotor shaft 46 and rotor shaft adapter means 32.

As seen in FIG. 5 a needle return spring 74 is positioned on the top of needle plate 56 and connected between the base of needle 70 and a spring connector screw 76.

Figure 4:
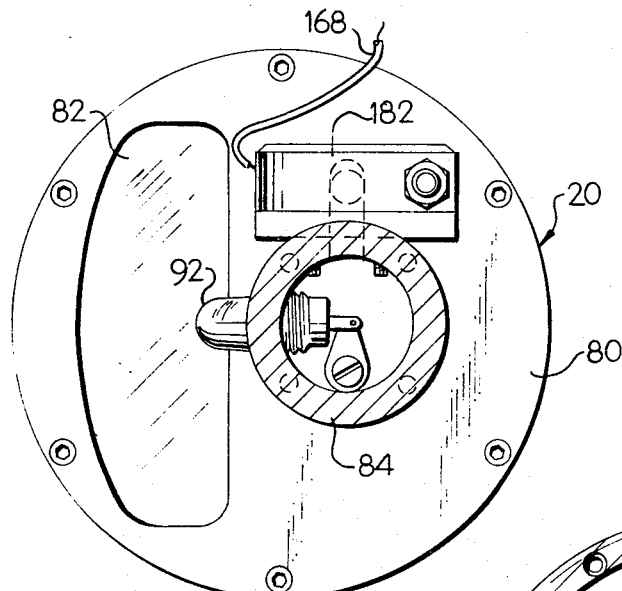
FIG. 4 is a top elevational view, partially in section, of the engine timer of the preceding figures with the view being taken along the line 4—4 of FIG. 3.

FIG. 4 illustrates a top cover plate 80 that includes a transparent window disc mounted above the indicia 72, and an annular lead connector 84 for receiving a cord 86 that connects with a power supply later to be described. Cord 86 passes through a removable cap 88 and an insulator bushing 90.

As seen in FIGS. 3 and 4, a warning signal light 92 is mounted on the side wall of annular lead connector 84 and serves to warn the operator of a possible improper use of the instrument, whereby erroneous readings are obtained, in a manner later to be described herein.

As is best seen in FIGS. 3 and 6, the previously described rotor shaft adapter means 32 includes a plurality of anti-backlash springs 94 each of which is connected between a spring anchor pin 96 which projects radially inwardly from side wall 22 of housing 20 and a spring mounting screw 98 carried by rotor plate 40.

In operation, after the distributor 28 has been installed on the engine, FIG. 8, the crank shaft 21 is turned over in the direction of engine rotation to a top dead-center position as indicated by a reference mark 27 on the periphery of a disk 23 with respect to a stationary pointer 25 carried by the engine block 29.

The engine must be turned to the top dead-center position in said direction of its rotation for, if this is not done, an error of up to four degrees may be induced by backlash in the driving gear train.

In normal practice the operator turns the crankshaft of the engine over with a bar and, if the operator should pass dead center, it is necessary to turn the crankshaft back at least 20 degrees so that the last 20 degrees of rotation prior to the timing operation is in the direction of rotation of the engine.

At the outset of the timing operation, timer housing 20 is next placed on the distributor housing 31 with rotor shaft adapter means 32 being keyed to distributor rotor shaft 46 in the manner previously described. Also, housing 20 of the adapter is keyed to the top of distributor housing 31 by means of the slots 30, FIG. 3.

Figure 10:
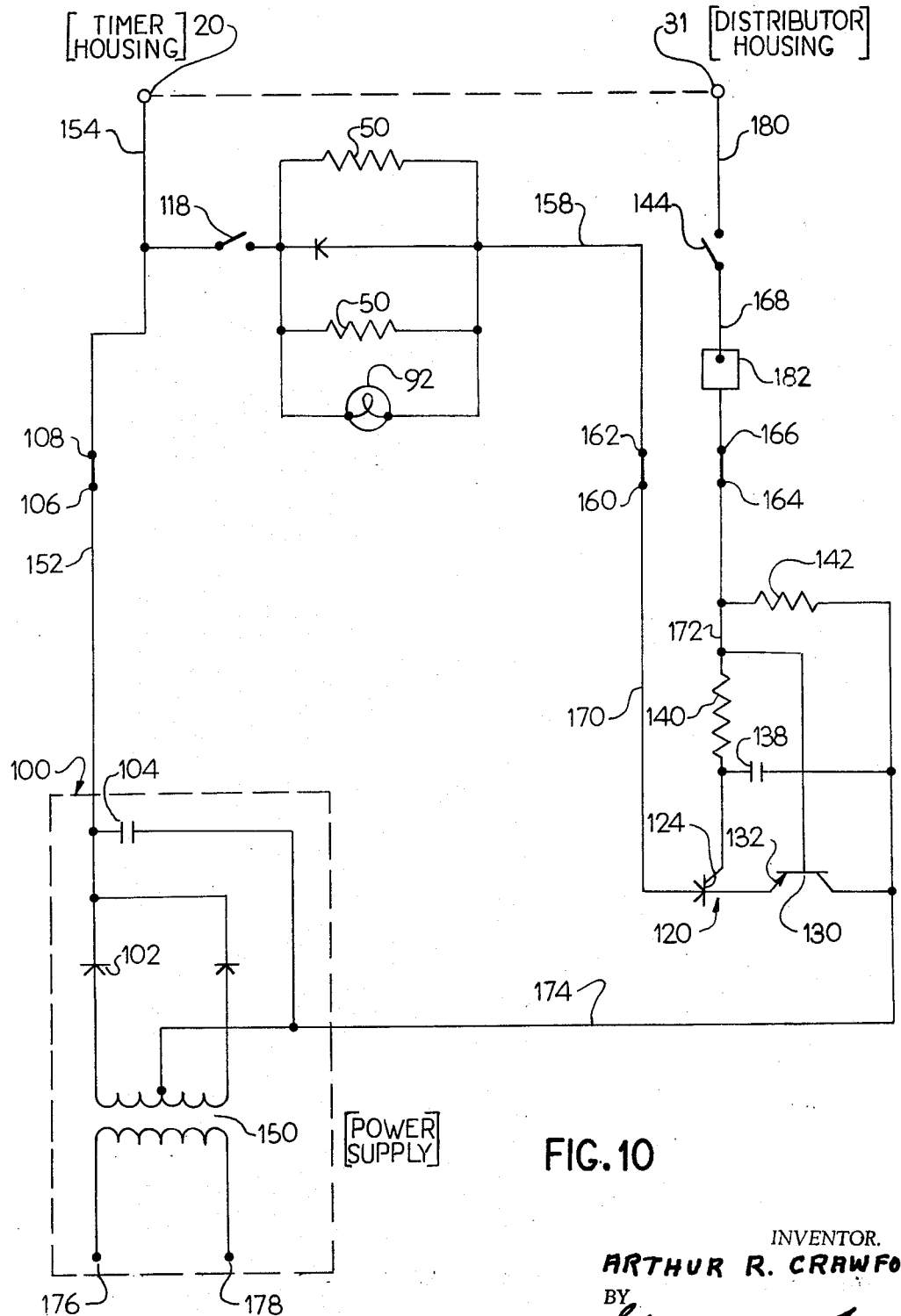
FIG. 10 is a diagrammatic view of a power supply and control circuit used with engine timer of the present invention.

With reference to FIG. 10, the apparatus comprises a power supply 100 that includes a transformer 150 that is plugged into a conventional source of alternating current at plug connections 176 and 178 and said power supply further includes a full wave rectifier 102 and a capacitor 104.

With continued reference to FIG. 10, when timer housing 20 is mounted on distributor housing 31, a wire 154 is connected to a wire 180, via contact between said housings, which closes micro-switch 118.

A silicon controlled rectifier 120 is off and non-conductive with the result that a transistor 130 is also turned off.

At this point it should be mentioned that the distributor points 144 must be closed in order to charge capacitor 138 through resistor 140.

Referring next to FIGS. 4 and 10, a lead wire 168 from the ignition points 144 of the distributor is next connected to a spring clip type terminal 182 mounted on the top of timer housing 20.

When the ignition points 144 are opened, by turning the distributor and timing housings relative to the rotor shaft, capacitor 138 discharges through gate 124 of silicon controlled rectifier 120 which turns on said rectifier 120.

At the same instant transistor 130 is turned on since wire 172 becomes more negative than the emitter 132 of transistor 130.

With silicon controlled rectifier 120 and transistor 130 both turned on, current will flow through the coils 50 of the previously mentioned electro-magnetic clutch means mounted on the rotor shaft adapter means 32. This serves to cause magnetic engagement between said coils 50 and metal gear clutch portion 52.

Also, when silicon controlled rectifier 120 and transistor 130 are turned on, the previously mentioned warning signal light 92 is also energized. It will now be understood that since the electro-magnetic clutch portions 50 and 52 are magnetically coupled, as the operator continues to turn the housings 20 and 31, the indicator needle 70 is caused to advance along scale 72 thereby progressively indicating the angular rotation of housings 20 and 31 relative to the top dead center reference.

When needle 70 indicates that housings 20 and 31 have been rotated to the proper position, distributor housing 31 is next locked in the timed position by a conventional locking bolt, not illustrated, that secures distributor housing 31 in its operational position against rotation with respect to the engine block.

Referring again to FIG. 10, when the operator removes timer housing 20 from distributor housing 31, the connection is broken between the housing contact, and hence between wires 154 and 180, which opens micro-switch 118 and thereby terminates the current through silicon controlled rectifier 120 whereby said rectifier is turned off.

At this point it should be mentioned that if timer housing 20 is positioned on distributor housing 31, with ignition points 144 in an open position, then silicon controlled rectifier 120 cannot be turned on. However, it should further be pointed out that transistor 130 will always be turned on when ignition points 144 are open and always turned off when ignition points 144 are closed. Hence it will be understood that warning light 92, when energized, always tells the operator that ignition points 144 have opened.

This indication is not only useful in informing the operator that a false reading will be obtained, but also in indicating, during properly oriented timing operation, that he should start decreasing his rate of speed of housing rotation and carefully read the dial indicator so as to stop precisely at the predetermined firing angle.

I claim:

1. An engine timer for setting the ignition timing of an internal combustion engine of the type that comprises pistons that move through top dead center positions in their cylinders, a distributor including a distributor rotor shaft driven by said engine, a distributor housing that can be rotated to various positions of advance and retard relative to said rotor shaft, and ignition points that are carried by said distributor housing and opened and closed responsive to rotation of said rotor shaft, said engine timer comprising rotor shaft adapter means connectable with said distributor rotor shaft; a timer housing adapted to be mounted on said distributor housing for keyed rotation therewith about said rotor adapter means; indicator means for the angle of rotation of said housings; and means for energizing said indicator means responsive to rotation of said housing and opening of said ignition points to indicate the degrees of angle of housing rotation beyond a point opening position.

2. An engine timer for setting the ignition timing of an internal combustion engine of the type that comprises pistons that move through top dead center positions in their cylinders, a distributor including a distributor rotor shaft driven by said engine, a distributor housing that can be rotated to various positions of advance and retard relative to said rotor shaft, and ignition points that are carried by said distributor housing and opened and closed responsive to rotation of said rotor shaft, said engine timer comprising rotor shaft adapter means connectable with said rotor shaft; a timer housing adapted to be mounted on said distributor housing for keyed rotation therewith about said rotor shaft adapter means; an indicator needle means mounted on said timer housing and including a driven needle shaft; and clutch means for connecting said driven needle shaft to said rotor shaft adaptor means responsive to rotation of said housing and opening of said ignition points.

3. The engine timer defined in claim 2 that includes an indicator light that is operated when said ignition points are opened.

4. The engine timer defined in claim 2 wherein said needle shaft is driven by a gear rotatably mounted on said timer housing, and wherein said clutch means comprises an electromagnet mounted on said rotor shaft adapter means and in circuit with said ignition points whereby opening of said points energizes said electromagnet and moves said gear and needle means.

5. The engine timer defined in claim 2 wherein said needle shaft is driven by a gear rotatably mounted on said timer housing, and wherein said clutch means comprises an electro-magnet mounted on said rotor shaft adapter means and in circuit with said ignition points whereby opening of said points energizes said electromagnet and moves said gear and needle means; and an indicator light in circuit with said ignition points, said light being operated when said ignition points are opened.

6. The engine timer defined in claim 2 that includes spring means operative between said rotor shaft adapter means and said timer housing.

7. The engine timer defined in claim 2 that includes a plurality of springs connected between said rotor shaft adapter means and said timer housing at spaced locations around the periphery of said adapter means, said spring serving to uniformly apply torque to said adapter means upon rotation of said housings relative to said rotor shaft.

8. An engine timer for setting the ignition timing of an internal combustion engine of the type that comprises pistons that move through top dead center positions in their cylinders, a distributor including a distributor rotor shaft driven by said engine, a distributor housing that can be rotated to various positions of advance and retard relative to said rotor shaft, and ignition points that are carried by said distributor housing and opened and closed responsive to rotation of said rotor shaft, said engine timer comprising a timer housing including a side wall and an open lower end adapted to be mounted on the top of said distributor housing with its cap removed; a rotor shaft adapter plate rotatably mounted in the lower portion of said timer housing and including key means for detachable connection with said distributor rotor shaft; a needle plate mounted in said housing above said shaft adapter plate; indicator needle means including a driven needle shaft mounted on said needle plate; electromagnetic clutch means for operating said needle means and including an electromagnetic clutch element mounted on one of said plates and in circuit with said ignition points, and a second clutch element mounted on the other of said plates and engaged by said electromagnetic clutch element responsive to opening of said points.

9. The engine timer defined in claim 8 that includes spring means operative between said rotor shaft adapter plate and said timer housing.

10. The engine timer defined in claim 8 that includes a plurality of springs connected between said rotor shaft adapter plate and said timer housing at spaced locations around the periphery of said adapter plate, said springs serving to uniformly apply torque to said adapter plate upon rotation of said housings relative to said rotor shaft.

11. The engine timer defined in claim 8 that includes an indicator light that is operated when said ignition points are opened.

12. The engine timer defined in claim 8 that includes an indicator light in circuit with said ignition points, said light being operated when said points are opened.

13. An engine timer for setting the ignition timing of an internal combustion engine of the type that comprises pistons that move through top dead center positions in their cylinders, a distributor including a distributor rotor shaft driven by said engine, a distributor housing that can be rotated to various positions of advance and retard relative to said rotor shaft, and ignition points that are carried by said distributor housing and opened and closed responsive to rotation of said rotor shaft, said engine timer comprising a timer housing including a side wall and an open lower end adapted to be mounted on the top of said distributor housing with its cap removed; a rotor shaft adapter plate rotatably mounted in the lower portion of said timer housing and including key means for detachable connection with said distributor rotor shaft; a needle plate mounted in said housing above said shaft adapter plate; indicator needle means including a driven needle shaft mounted on said needle plate; a metal gear mounted on the bottom of said needle plate and engaging said driven needle shaft; and electromagnetic means mounted on the top of said rotor shaft adapter plate and in circuit with said ignition points whereby energization of said electromagnetic means connects said metal gear to said electromagnetic means and causes movement of said needle means responsive to rotation of said housings.

References Cited

UNITED STATES PATENTS

| | | |
|---|---|---|
| 2,355,211 | 8/1944 | Erickson. |
| 2,571,959 | 10/1951 | Smith _____ 73—118 X |
| 2,774,033 | 12/1956 | Penn _____ 324—16 |

OTHER REFERENCES

Judge, A. W.: The Testing of High Speed Internal Combustion Engines, 4th ed. revised, 1955, London, Chapman and Hall Ltd., pp. 464 and 465.

JERRY W. MYRACLE, Primary Examiner

U.S. Cl. X.R.

324—16